(12) United States Patent
Selitser et al.

(10) Patent No.: US 8,788,580 B2
(45) Date of Patent: Jul. 22, 2014

(54) EVENT BROKER FOR AN IMPROVED APPLICATION SERVER PLATFORM FOR TELECOM-BASED APPLICATIONS

(75) Inventors: Boris Selitser, Castro Valley, CA (US); Jean Bovet, Los Angeles, CA (US); Eugene Ponomarenko, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 284 days.

(21) Appl. No.: 13/339,287

(22) Filed: Dec. 28, 2011

(65) Prior Publication Data

US 2012/0173614 A1 Jul. 5, 2012

Related U.S. Application Data

(60) Provisional application No. 61/428,129, filed on Dec. 29, 2010, provisional application No. 61/432,554, filed on Jan. 13, 2011.

(51) Int. Cl.
*G06F 15/16* (2006.01)

(52) U.S. Cl.
USPC .......................................... 709/203; 709/223

(58) Field of Classification Search
CPC .................................................. H04L 29/06047
USPC ..................................................... 709/203, 223
See application file for complete search history.

(56) References Cited

U.S. PATENT DOCUMENTS

| | | | |
|---|---|---|---|
| 7,593,980 B2 * | 9/2009 | Marascio et al. | 709/201 |
| 2003/0046395 A1 * | 3/2003 | Fleming et al. | 709/226 |
| 2003/0191679 A1 * | 10/2003 | Casati et al. | 705/8 |
| 2006/0294417 A1 * | 12/2006 | Awasthi et al. | 714/10 |
| 2007/0240166 A1 * | 10/2007 | Marappan | 719/318 |

* cited by examiner

*Primary Examiner* — Philip B Tran
(74) *Attorney, Agent, or Firm* — Meyer IP Law Group (57) ABSTRACT

In accordance with various embodiments, a set of features are described for enabling an application server platform for telecom based applications. A system for providing an application server for telecom-based applications can include an application server that includes an event broker distributed across a cluster. The event broker can provide a distributed publish-subscribe mechanism that is a generic interface to all server nodes in the cluster. The event broker filters events with event attributes by way of matching criteria. Additionally, the event broker is used to dispatch events to specific listeners based on certain criteria.

20 Claims, 8 Drawing Sheets

EVENT BROKER FOR AN IMPROVED APPLICATION SERVER PLATFORM FOR TELECOM-BASED APPLICATIONS

CLAIM OF PRIORITY

This application claims the benefit of priority to U.S. Provisional Patent Application No. 61/428,129, titled "IMPROVED APPLICATION SERVER PLATFORM FOR TELECOM-BASED APPLICATIONS", filed on Dec. 29, 2010; and U.S. Provisional Patent Application No. 61/432,554, titled "APPLICATION SERVER PLATFORM HAVING A DEPLOYMENT MANAGEMENT SERVICE, CONFIGURATION SERVICE, TCAP ADAPTER, SIP ADAPTER AND A JAVA MEDIA SERVER CONTROLLER", filed on Jan. 13, 2011; each of which applications are herein incorporated by reference.

CROSS REFERENCE TO RELATED APPLICATIONS

The present application is related to U.S. patent application Ser. No. 13/339,252, titled "IMPROVED APPLICATION SERVER PLATFORM FOR TELECOM-BASED APPLICATIONS USING AN ACTOR CONTAINER", filed on Dec. 28, 2011; and U.S. patent application Ser. No. 13/339,300 titled "IMPROVED APPLICATION SERVER PLATFORM FOR TELECOM-BASED APPLICATIONS HAVING A TCAP ADAPTER, SIP ADAPTER AND ACTOR PROTOCOL CONTEXT", filed on Dec. 28, 2011; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The current invention relates to mobile communications and in particular to providing application server platform for applications that utilize telecom-based functionality.

BACKGROUND

In today's world of telecommunications, more and more devices and functionalities are being integrated with one another in order to create new features and capabilities for the everyday user, as well as for large organizations and enterprises. Numerous examples of this can be seen in the realms of mobile devices, cellular phones and computers. Everything from electronic mail, internet access, text messaging, video and digital photography to video games, social networking and other forms entertainment, are becoming available for a wide variety of mobile devices. Countless web applications now provide services that can access or be accessed via mobile phone to enable a particular feature.

Given all of this pervasiveness, the management of software applications must expand in order to accommodate a multitude of mediums and modes of operation previously unconsidered by most developers. As a simple illustration, in order to allow an internet user of a web application to set up a conference telephone call between several end subscribers, the application must be able to interact in some meaningful way with multiple and substantially different protocols and networks. This is the general environment within which embodiments of the invention are intended to be used.

SUMMARY

In accordance with various embodiments, a set of features are described for enabling an application server platform for telecom based applications. A system for providing an application server for telecom-based applications can include an application server that includes an event broker distributed across a cluster. The event broker can provide a distributed publish-subscribe mechanism that is a generic interface to all server nodes in the cluster. The event broker filters events with event attributes by way of matching criteria. Additionally, the event broker is used to dispatch events to specific listeners based on certain criteria.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

In accordance with various embodiments, a set of features are described for enabling an application server platform for telecom based applications. The application server provides a protocol-neutral programming model for application developers. Rather than having to account for specific protocol entry points into the server, all interactions in the server are abstracted as asynchronous events through the event broker layer. State management and concurrency are implemented as an actor-based model, where each actor owns its own segment of state and other actors wishing to update that state send asynchronous events to the owner. This architecture allows multiple protocols to be consumed in one process, allow applications sessions to span multiple environments and protocols, and allows the programming model to be decoupled from any particular protocol entry point.

GLOSSARY

In accordance with an embodiment, the following terms as used herein are defined below.

Actor: An entity in the Actor Mode, with runtime properties provided by the Actor Container.

Actor Container: Set of bundles and function responsible for providing APIs and runtime environment for actor based applications.

Actor Framework: Usually a synonym of Actor Container.

Actor Factory: Factory used to request creation of other actors.

Actor Links Hint that an actor being created is linked to the creator and that optimizations on communication with it would be greatly beneficial.

Actor Model: Mathematical model representing an event based actor programming model through use of the actor container.

Actor Store: Actor specific store with isolated view of data written by this actor; see also Storage Service.

APE: See Actor Protocol Extension.

Actor Protocol Extension: Protocol adapter extension to actors that send and/or receive events from mentioned Protocol adapter.

Bundle: OSGi bundle, deployment artifact consisting of jar file with OSGi specific manifest properties.

Coherence: Oracle Coherence.

Declarative Services: OSGi compendium specification for OSGi service dependency definition and injection.

Event Broker: System feature for managing events.

Event Channel: An abstraction for application events sent from many to one subscribing actor over typed event channels; also the client side interface used to publish such events.

Event Channel Factory: Factory used to create event channel ports and open/subscribe handlers to event channels.

Event Channel Port: Template that can be used to reserve a channel of a specified type to be opened at a later time, possibly by another actor.

Event Channel Session: Session representing an open channel; this is used to later close and unsubscribe from the channel.

Falcon: A particular embodiment of the event based platform developed for OCCAS.

OCCAS: Oracle Communications Converged Application Server, a product family that includes a SIP server.

OSGi: A set of service platform and framework specifications.

Protocol Extension: See Actor Protocol Extension.

Storage Service: feature managing cluster storage.

Figure 1:
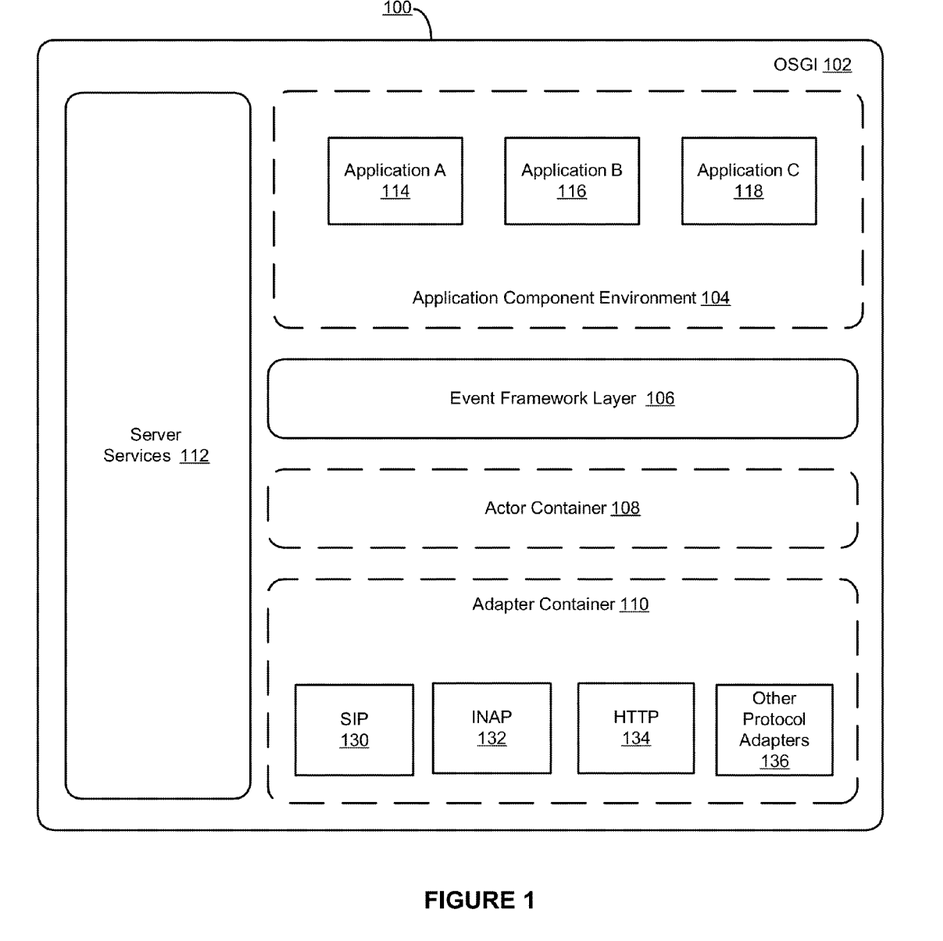
FIG. 1 is a functional illustration of an application server, in accordance with various embodiments of the invention.

FIG. 1 is a functional illustration of an application server, in accordance with various embodiments of the invention. Although FIG. 1 depicts components as logically separate, such depiction is merely for illustrative purposes, and the components illustrated therein can otherwise be combined or divided into separate software, firmware and/or hardware. Furthermore, such components, regardless of how they are combined or divided, can execute on the same computing device or can be distributed among different computing devices connected by one or more networks or other suitable communication means.

As illustrated in FIG. 1, in accordance with an embodiment, the application server 100 can include an OSGI kernel 102, an application component environment 104, an event framework layer 106, an actor container 108, an adapter container 110, and a selection of server services 112.

The OSGI kernel provides lifecycle management, class loading, dependency resolution and deployment features for the application components on the server. In accordance with an embodiment, the application components, such as applications 114, 116, 118, can be basic OSGI bundles deployed on the server.

The event framework layer provides an event-based communication model between the application component environment and the adapter container. In particular, the framework layer provides an event broker that maps all protocol-specific communications exposed by the various protocol adapters 130, 132, 134, 136 into asynchronous events, which can be consumed by the application components. Additionally, the application components can produce asynchronous events for propagation to the protocol adapters via the event broker.

The protocol adapters 130, 132, 134, 136 enable the application server to support multiple protocols. In accordance with an embodiment, each of a plurality of various protocols, such as a session initiation protocol (SIP) 130, an intelligent network application part (INAP) of the SS7 protocol 132, a hypertext transfer protocol (HTTP) 134, or many other protocols 136, can have their own adapter. These protocol adapters then interface with the adapter container, the event framework, the actor container and the server services. The adapter container can expose a service provider interface, for use in building new protocol adapters as new protocols emerge or become more widely used.

In accordance with an embodiment, the event framework layer is used to communicate with application components. With respect to the event model, the protocol adapters are consumers and producers of asynchronous events. The SPI interfaces implemented by protocol adapters reflect the complexity relative to application components. Primarily, adapters implement efficient input and output operations (I/O) towards a specific protocol. In addition, protocol-specific security, error handling, and abstraction can be encapsulated in adapters. The adapter container is designed to support a contract in which it cooperates with the adapters to provide connectivity to the network by the application components.

The server services act as basic building blocks for the rest of the functionality implemented on the application server. In accordance with an embodiment, these services are protocol neutral, reusable, and shared by the other layers of the stack. The set of services illustrated in FIG. 1 is not intended to be limiting or exhaustive, and is instead being provided for purposes of illustration. In accordance with an embodiment, various server services can be implemented as needed to address the particular needs of an application developer. For example, a clustering service can be used to maintain cluster membership/replication, while an SLA management service can be used to keep track of service level agreement (SLA) enforcement.

Event Broker

In accordance with an embodiment, the application server includes an event broker that provides a distributed publish-subscribe mechanism, generic interface to all server nodes. In accordance with one embodiment, all nodes are identical. The event broker further provides an ability to filter arbitrary events with arbitrary event attributes (i.e. arbitrary matching criteria). In addition, the server includes a Hash Function feature. The event broker is used to dispatch events to specific listeners based on certain criteria, and is able to dispatch an event from one server node to another node in the cluster. In accordance with an embodiment, the event broker can be deployed in each server in the cluster, and can use, e.g. Coherence, for all distribution and state management in the cluster.

Figure 2:
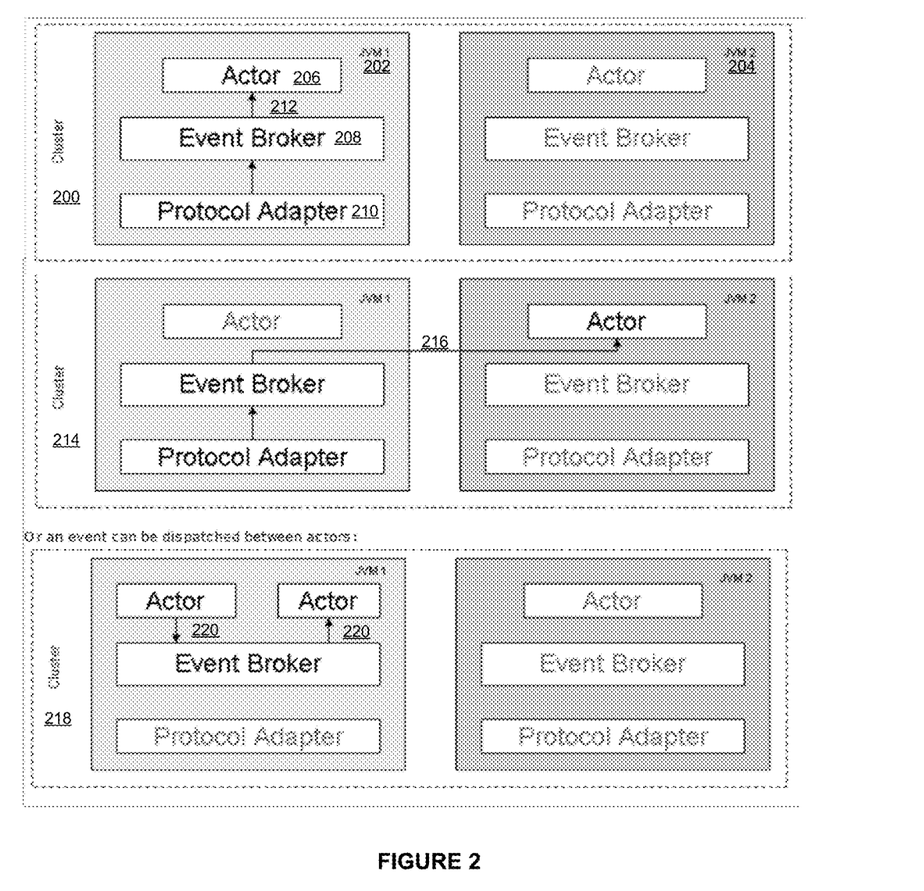
FIG. 2 is an illustration of the event broker, in accordance with various embodiments of the invention.

FIG. 2 is an illustration of the event broker, in accordance with various embodiments of the invention. As shown in FIG. 2, a cluster 200 can include multiple JVMs, including JVM 1 202 and JVM 2 204. Each JVM can include one or more Actors 206, an event broker 208, and one or more protocol adapters 210. An event broker can dispatch 212 an event from a protocol adapter to an actor in the same Java Virtual Machine (JVM). Alternatively, as shown in cluster 214, an event broker can dispatch 216 an event from a protocol adapter in one JVM to an actor in a different JVM. Additionally, as shown in cluster 218, an event broker can dispatch 220 an event between actors in the same JVM.

Figure 3:
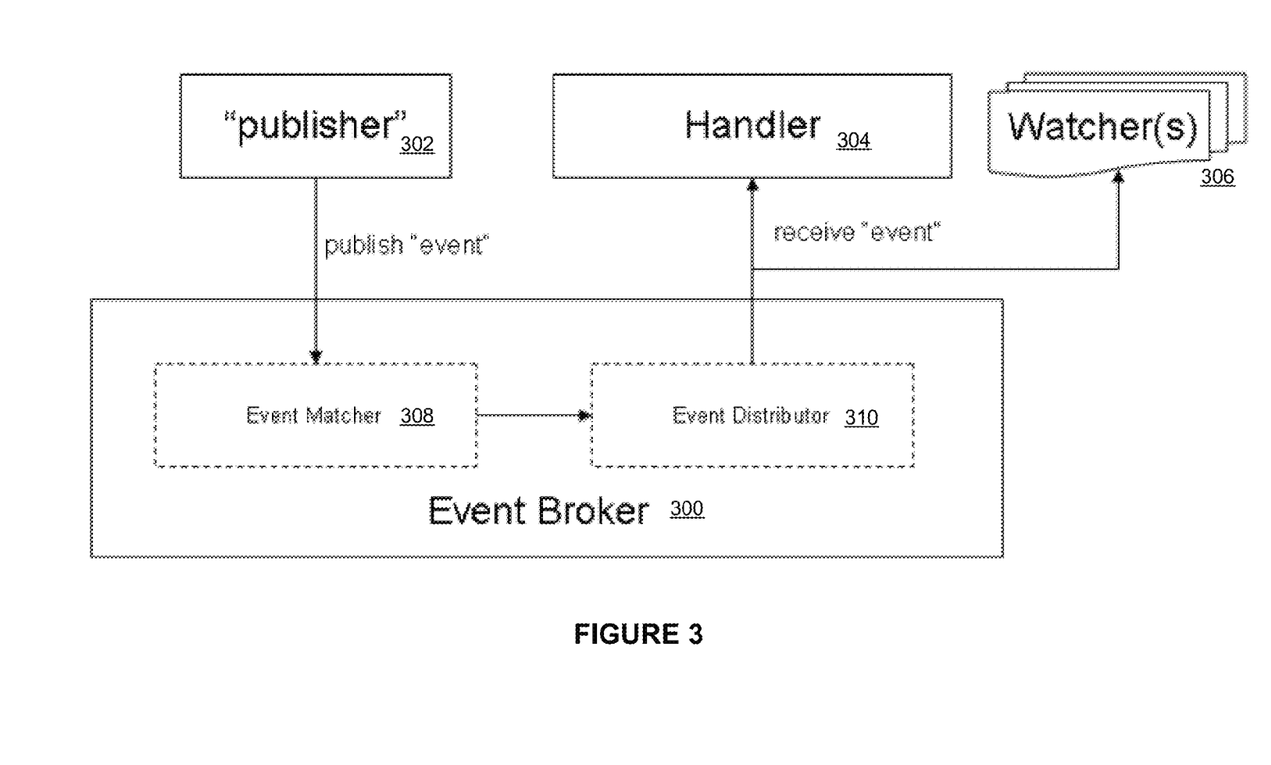
FIG. 3 shows a publish/subscribe system which includes an event broker, in accordance with an embodiment.

FIG. 3 shows a publish/subscribe system which includes an event broker, in accordance with an embodiment. As shown in FIG. 3, the event broker 300 (EB) interacts with several components, including a publisher 302, a handler 304, and one or more watchers 306. The publisher is a component that uses the EB to publish an event. The handler is a component which can receive events distributed by the EB. The watcher is a component interested in "listening" only to the event, and can receive events from the EB. Additionally, the EB includes two internal components, a matcher 308 and a distributor 310. The matcher finds the handler and any watchers which are interested in the event being published. Handlers and watchers can be registered with the EB so that they can be notified when an event. The distributor then forwards the event to the handler, either locally or to another JVM if needed.

Figure 4:
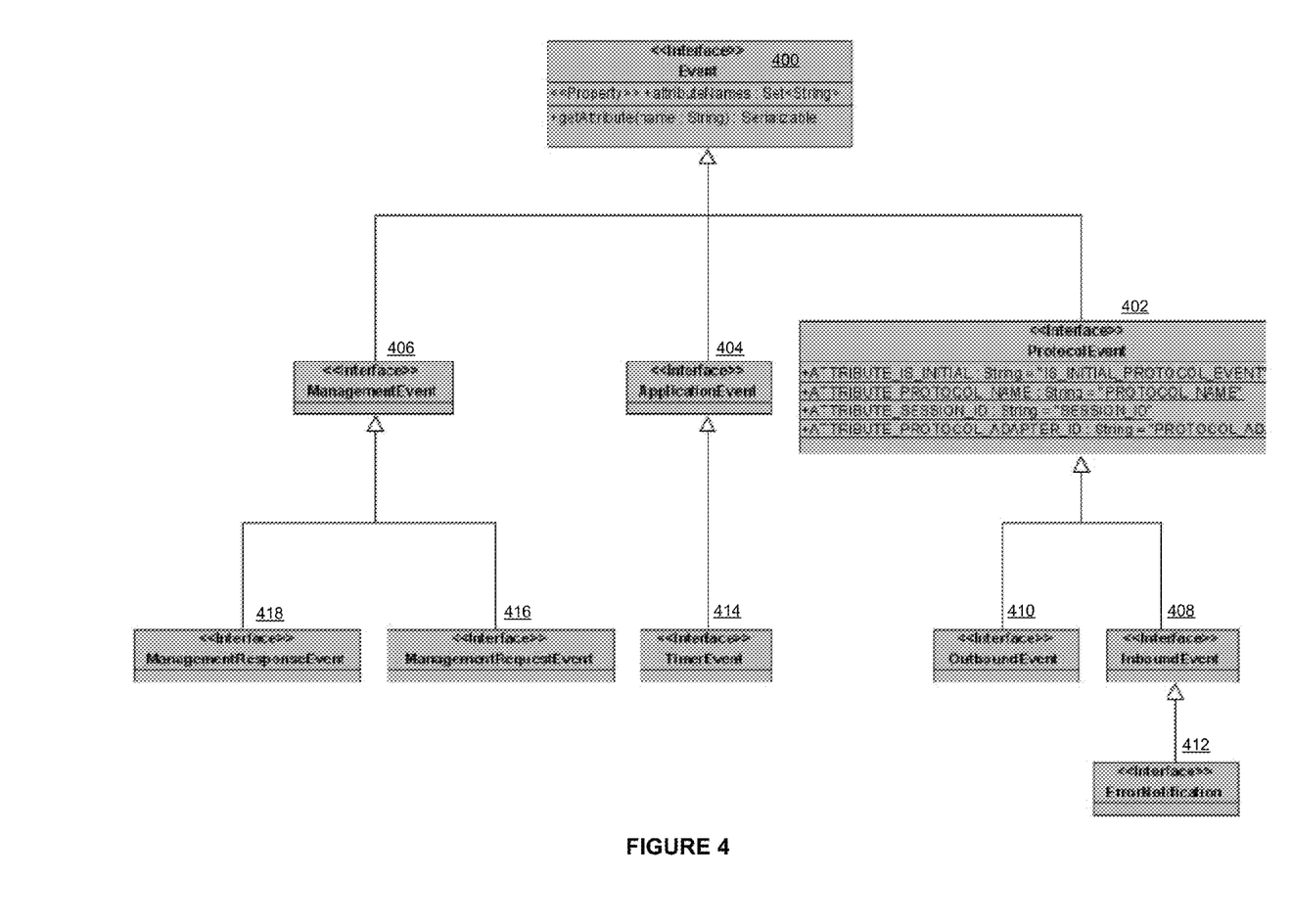
FIG. 4 shows a hierarchy of different types of events, in accordance with an embodiment.

FIG. 4 shows a hierarchy of different types of events, in accordance with an embodiment. In accordance with an embodiment, a plurality of different types of events can be managed by the event broker. As shown in FIG. 4, an event 400 can be any of a protocol event 402, an application event 404 or a management event 406. Protocol events are a general type of events that are involved in interaction with Protocol Adapters. Protocol events can include inbound events 408, which are protocol events that are published from Protocol Adapter producers to the Application Environment consumers, and outbound events 410, which are protocol events that are published from Application Environment producers to the Protocol Adapter consumers. An error notification 412 is a particular kind of incoming event. Error notifications are asynchronous notifications to the Application Environment of an error associated with a protocol adapter.

Application events can be used for communication between consumers and producers in the Application Environment. One kind of application event is the timer event 414, which can be passed back to the Application Environment when a scheduled one-time or periodic timer is triggered. Management events can be used in processing management functions. These events are generally hidden from Actor authors. The management events can include a management request event 416 encapsulating a management operation or attribute read/update from a management client, and a management response event 418 which includes the result of a corresponding management request event.

In accordance with an embodiment, an event listener can be used to process events as they are published. There are two types of listener, an event handler and an event watcher. The event handler is associated with a particular event and processes that event. There is only one event handler per matching event allowed. Event watchers passively process events, and multiple event watchers can be associated with (i.e., watching for) the same event. For example, an actor can have one or more event handler, each associated with a different event (e.g. one for an sip invite event, etc.). However, some components, such as a logging bundle, might be interested by several or all of the events that are received. That component can then register an event watcher which will "watch" or monitor those events that come in.

In accordance with an embodiment, an event listener (either a handler or a watcher) can register with the EB to monitor one or more events. In accordance with an embodiment, the EB allows only one eventmatcher per eventmatching. Thus, it is important that criteria used to identify an event are chosen in such a way that they are not overlapping with another component (e.g., choosing a specific attribute of the event that can help differentiate this event from another one). An event watcher can only be invoked if an event handler is also registered for the particular event in the same node where the watcher is registered. Generally, a watcher is registered in all the nodes of the cluster to ensure it will be invoked when its corresponding handler is invoked. A scheduler parameter can be used to define how an event will be scheduled to the handler. This permits custom scheduling pattern.

In accordance with an embodiment, event matching takes place in the EB instance where the event is published. Event matching can include a set of criteria which define a set of predicates that are used to perform the match between an event and a particular handler. A predicate can include a name and value that are matched against the attributes of an event: For example, equality and non-equality predicates are supported (in other words, the predicates can be tested for equals( )). However, custom predicates can also be defined.

When publishing an event, the event broker identifies matching event handlers and selects the matched handler(s). If no event handler is found, the exception NoEventHandlerException is thrown. If more than one handler is found, the exception TooManyEventHandlerException is thrown. Otherwise, the EB looks up the location of the handler and sends the event to the handler, for example by using the Coherence Invocation Service (if the handler is located in another node, the Invocation Service will execute the invocation in that particular node).

In accordance with an embodiment, each time a listener is added or removed, the matching table used in the event matching is updated in all of the nodes. To achieve that, each EB listens for change in the criteria table using a map listener.

In accordance with an embodiment, hashing can be used to load-balance a group of events between several handlers. To achieve that, it is possible to compute hash value for each event being published and to register handlers for a particular range of hash values. A hash function can be used which does not change once registered. The hash function can be deployed and registered in the EB in all the servers. Multiple hash functions can be registered for the same event type as long as the attribute name is different. The hash function is enabled as soon as it is registered. The hash function can be invoked each time an event of that type is published. The resulting hash value can be stored in an additional attribute of the event (as defined by the hash function). In accordance with an embodiment. Only events extending the BaseEvent class are assigned a hash value where the Event interface is read-only.

Each handler interested in being invoked for a particular range of hash values has to provide an additional criteria to indicate the range of values it is interested in. The name of the attribute is defined by the hash function. The additional criteria would be less-than or greater-than criteria. Because the hash function is not persisted by the EB, the current model assumes that the hash function will be available and registered in all the servers. It is the responsibility of the hash function provider to deploy the bundle containing the hash function and to register it in all the servers.

Exemplary Scenarios

Figure 5:
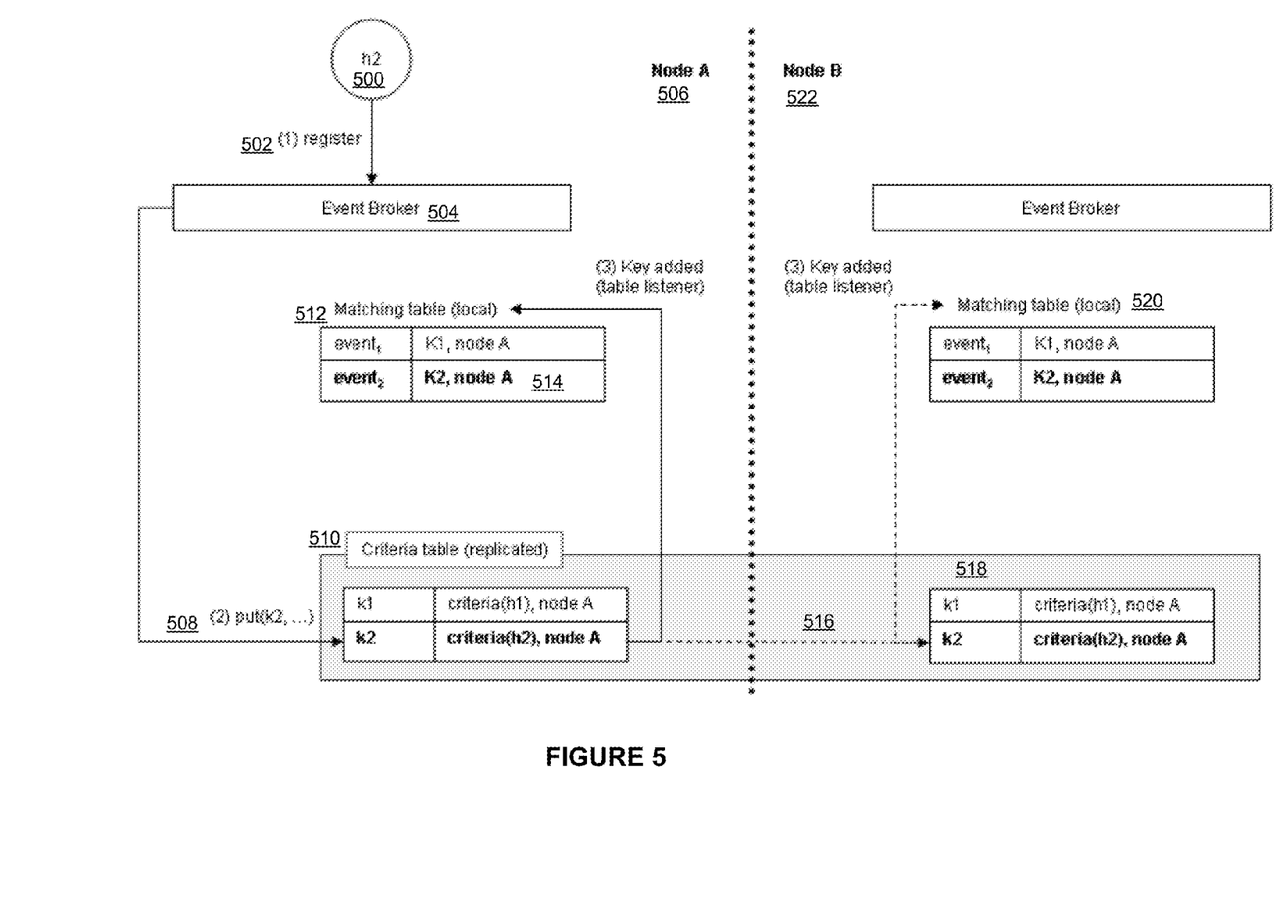
FIG. 5 shows an illustration of the registration of an event handler, in accordance with an embodiment.

This section describe the various scenarios which can occur in a cluster, in accordance with an embodiment. In these scenarios, the criteria are being propagated in the cluster using a replicated store. The events themselves are propagated to the destination node using the Coherence Invocation Service. Additionally, keys k1 and k2 are auto-generated keys in the criteria store each time a handler is registered FIG. 5 shows an illustration of the registration of an event handler, in accordance with an embodiment. Event Handler h2 500 registers 502 with the event broker (EB) 504 on Node A 506. The EB puts 508 h2 and its associated criteria into a Criteria table 510 along with the node name (Node A in this case). When the criteria table is updated, a matching table 512 is notified of the change and a key K2 514 is added to the matching table. Additionally, the changes to the criteria table and matching table are replicated 516 to the criteria table 518 and matching table 520 on Node B 522.

Figure 6:
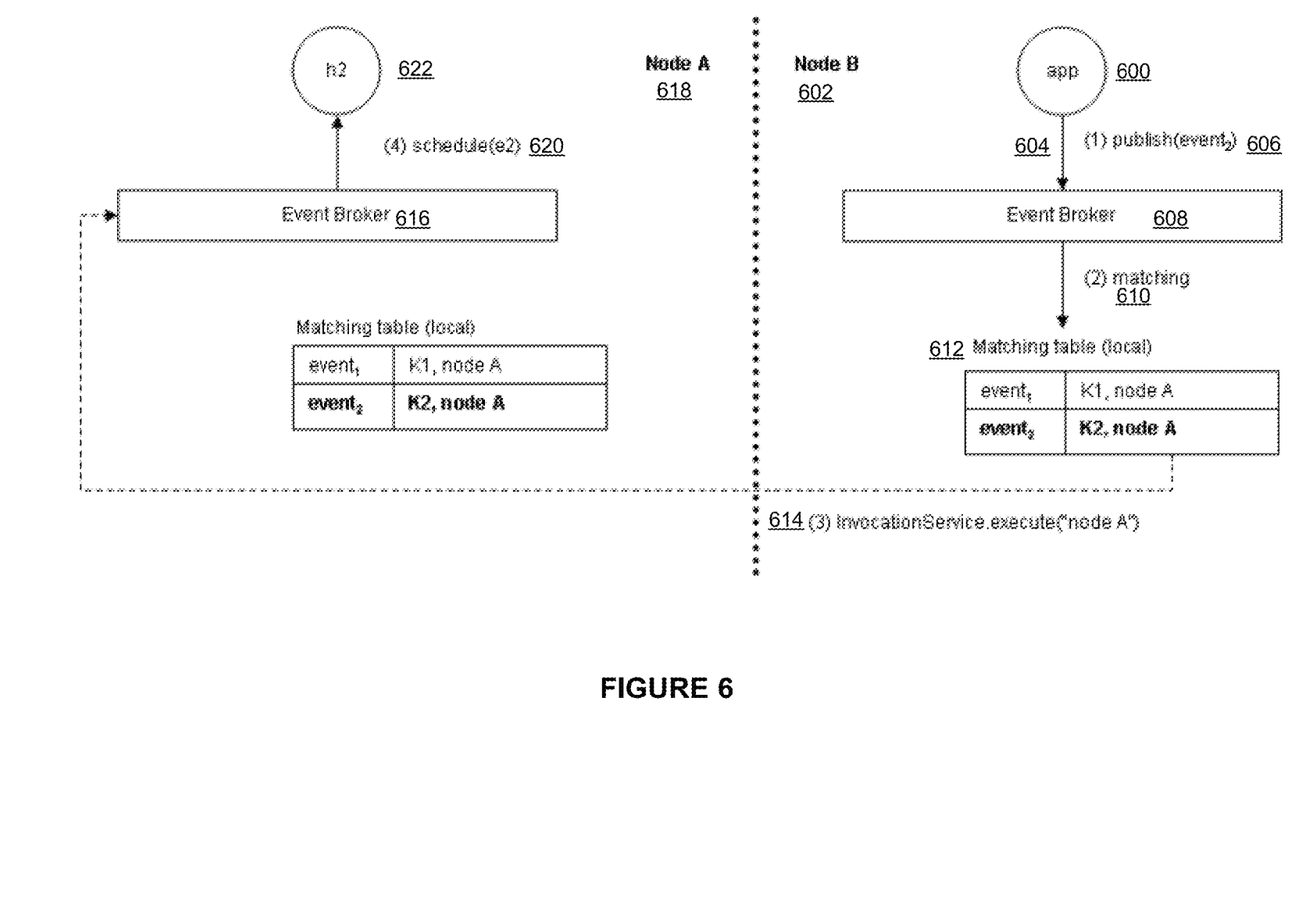
FIG. 6 shows an illustration of the publication of an event, in accordance with an embodiment.

FIG. 6 shows an illustration of the publication of an event, in accordance with an embodiment. As shown in FIG. 6, an application 600 on Node B 602, publishes 604 an event e2 606. Event broker 608 receives the event and matches 610 the event using matching table 612. Using the matching table, it is determined that k2 matches e2 (and that k2 is located on node A). The event broker then notifies 614 the event broker 616 on Node A 618 which schedules delivery 620 of the event to its registered handler h2 622.

Figure 7:
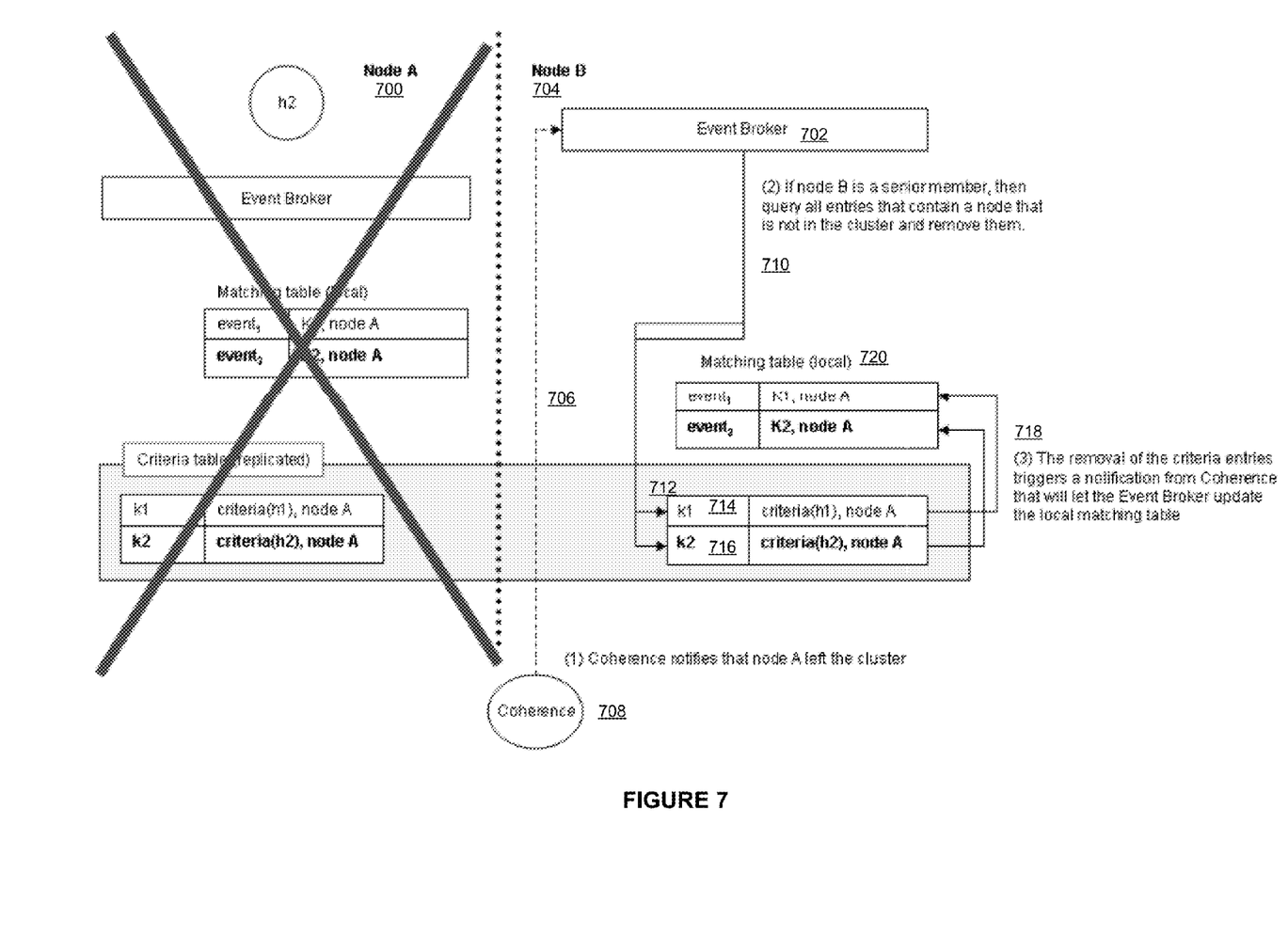
FIG. 7 shows an illustration of a node crash, in accordance with an embodiment.

FIG. 7 shows an illustration of a node crash, in accordance with an embodiment. As shown in FIG. 7, when node A 700 crashes, the event broker 702 on node B 704 is notified 706 by Coherence 708 that node A left the cluster. If node B is a senior member of the cluster (and one of the remaining nodes in the cluster will be a senior member), then it will query 710 the entries in the criteria table 712 that are not part of the cluster and remove them. For example, as shown in FIG. 7, both entries k1 714 and k2 716 in the criteria table are associated with Node A and are removed. Each criteria removal triggers a notification 718 that updates the local event broker's matching table 720. Although the event broker removes entries associated with the crashed node, it is up to the application to re-register its handlers as necessary.

Figure 8:
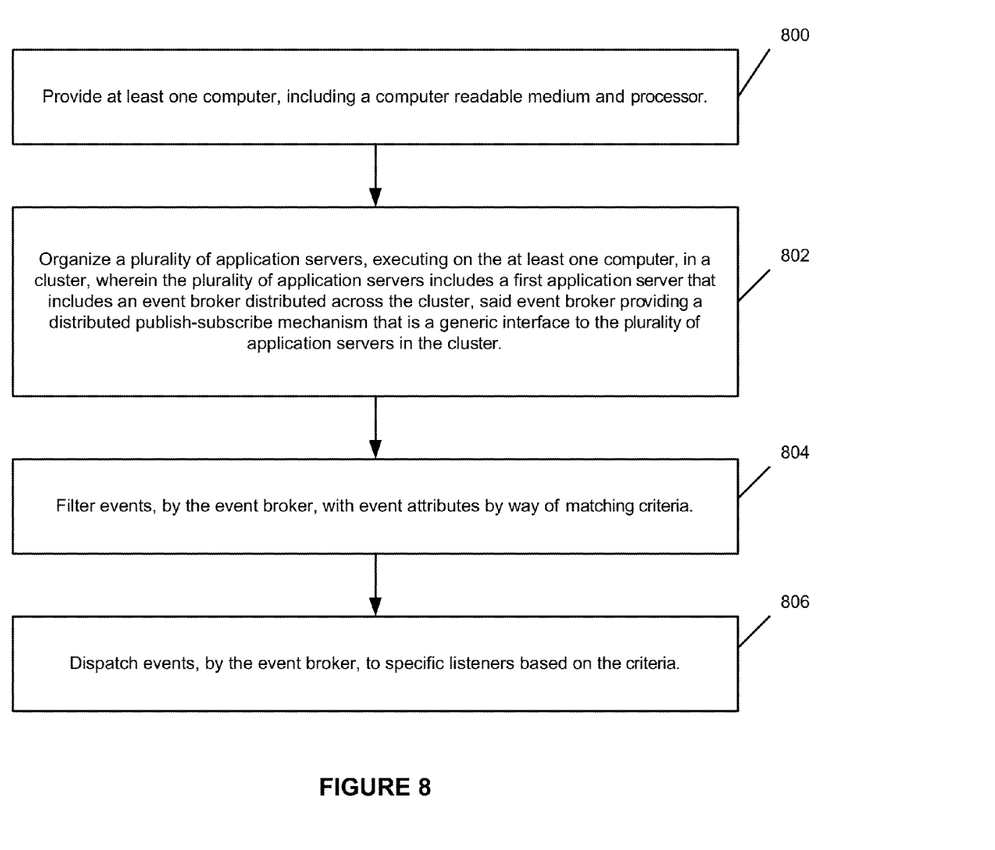
FIG. 8 shows a method of providing an application server for telecom-based applications, in accordance with an embodiment.

FIG. 8 shows a method of providing an application server for telecom-based applications, in accordance with an embodiment. At step 800 at least one computer, including a computer readable medium and processor, is provided. At step 802, a plurality of application servers, executing on the at least one computer, are organized in a cluster. The plurality of application servers includes a first application server that includes an event broker distributed across the cluster. The event broker provides a distributed publish-subscribe mechanism that is a generic interface to the plurality of application servers in the cluster. At step 804, events are filtered by the event broker, using event attributes by way of matching criteria. At step 806, events are dispatched, by the event broker, to specific listeners based on the criteria.

Event Broker Class Loading

In accordance with an embodiment, the application server provides distributed class loading with an OSGi-type of class-loading framework. Marshalling/unmarshalling classes are sent from one virtual machine (VM) instance with a specific classloader graph instance to another VM instance with a different classloader graph.

An event factory interface can be used to extend an OSGi Service Factory. Any bundle that would like to play the role of an event factory can implement the interface and register it as a service factory in the service registry. This can include event factories for protocol events, application events and other event types. In accordance with various embodiments, the telecom application server can also provide a protocolAdapterEventBroker interface, an applicationEventBroker interface and commonEventBroker interface.

In accordance with an embodiment, bundles using ApplicationEventBroker and ProtocolAdapterEventBroker services can specify associated event factories at the time these services are obtained. Thereafter, these specified event factories could not be changed once the event broker services are obtained. This can be automated for the Actor code through configuration of the protocol event factories used by a given Actor. Event factories can be specified as an ordered list at the time the event broker services are obtained. Multiple event factories can support the same or assignable event type. The order of the event factories specified at the time event broker services are obtained can determine the precedence of what event factory to invoke loadEvent( ).

In accordance with an embodiment, a collection of event factories is associated with a particular instance of the event broker service. All event registrations made through that event broker service instance have an implicit association to the same event factories. The event factories supporting the event type of the registration are used to load a deserialized event based on the precedence rules above. If none of the event factories support the event type of the registration, the Bundle that obtained the event broker service is used to load the deserialized event. This obtaining Bundle is determined by obtaining event broker services through a ServiceFactory. An application can register for any of the EventTypes supported by the specified event factory. An application that can process events generated by different protocol adapters or different event factories should not register for a base event that is supported by more then one factory used by an application. As an example, the application that processes both CAP and MAPEvents, should not register for Tcapinbound Event that is a base interface for both Cap2 InboundEvent and MapinboundEvent. That can create an ambiguous situation where an event broker would not know which factory bundle should be used to load TcapinboundEvent. A protocol adapter event broker interface can extend OSGi ServiceFactory. ServiceFactory can return a separate instance of the protocol adapter event broker for each protocol adapter bundle. Event factories can be registered with the protocol adapter event broker using a registerEventFactorys class.

In accordance with an embodiment, non Actor-based applications can use request application event broker service. The application event broker interface can extend OSGi ServiceFactory. ServiceFactory can return a separate instance of the protocol adapter event broker for each application bundle. Each instance can save an application bundle received through the BundleContext of the application requesting application event broker service. Event factories can be registered with the application event broker interface using a registerEventFactories method. If no EventFactory is specified, the event broker can use the application bundle to load the Event. ActorFW can use the new application event broker factory that uses actor BundleContext to request an instance of the application event broker instead of application Class Loader. Applications can forward original inbound protocol adapter events from one app to another through by publishing the events through the event broker. Generally, applications should not encapsulate protocol adapter events or any factory created objects in Application Events it publishes to the event broker.

In accordance with an embodiment, a common event broker interface enables events to be serialized by the event broker and sent to Coherence in an EventProcess or an envelope as a byte array. Upon event arrival, the event broker can match the event to a key from the EventProcess or to the registration. When a registered Event is found and matched to the event factory, the correct bundle is loaded and the event is deserialized. In accordance with an embodiment, the event broker can use the Coherence Externalizable Helper serialization API for optimized serialization/deserialization. When the event broker can not match an event type class (for example, as in the case of an Application Event that is not supported through an event factory), the event recipient bundle can be used for event class loading.

The use of custom criteria and predicate classes can be restricted to only event broker defined classes. Additionally, predicate values can be restricted to primitive types. This can limit the need to perform special de-serialization for some objects.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for providing an application server for telecom-based applications, said system comprising:
    at least one computer, including a computer readable medium and processor;
    a plurality of application servers, executing on the at least one computer, organized in a cluster;
    a first application server that includes an event broker distributed across the cluster, said event broker providing a distributed publish-subscribe mechanism that is a generic interface to the plurality of application servers in the cluster;
    wherein the event broker filters events with event attributes by way of matching criteria;
    wherein the event broker is used to dispatch events to specific listeners based on the criteria; and
    wherein each application server provides distributed class loading with an OSGi-type of class loading framework, wherein marshalling and un-marshalling classes are sent from one virtual machine (VM) instance with a specific class loader graph to another VM instance with a different class loader graph.

2. The system of claim 1, wherein the event broker maps protocol-specific communications exposed by a plurality of protocol adapters into asynchronous events to be consumed by application components.

3. The system of claim 1, wherein the application server provides a set of functionally specific domains which are communicating through the cluster; and
    wherein the application server can automatically switch the domain a particular machine is hosting; and
    wherein the application server provides a domain image (DI) and the initial provisioning for the domain.

4. The system of claim 1, wherein each application server in the cluster includes an instance of the event broker.

5. The system of claim 1, wherein when an event handler registers with the event broker, the event handler stores the event handler and an associated criteria in a criteria table and wherein an event associated with the event handler and a key associated with the criteria table are added to a matching table.

6. The system of claim 5, wherein when an application publishes an event, the event broker receives the event and matches the event to an event handler using the matching table, and wherein the event broker notifies the event handler of the event.

7. The system of claim 5, wherein when an application server fails, the event broker is notified that the application server has left the cluster and the event broker removes entries from the criteria table associated with the application server.

8. A method for providing an application server for telecom-based applications, comprising:
    providing at least one computer, including a computer readable medium and processor;
    organizing a plurality of application servers, executing on the at least one computer, in a cluster, wherein the plurality of application servers includes a first application server that includes an event broker distributed across the cluster, said event broker providing a distributed publish-subscribe mechanism that is a generic interface to the plurality of application servers in the cluster;

filtering events, by the event broker, with event attributes by way of matching criteria;

dispatching events, by the event broker, to specific listeners based on the criteria; and providing distributed class loading with an OSGi-type of class loading framework, wherein marshalling and un-marshalling classes are sent from one virtual machine (VM) instance with a specific class loader graph to another VM instance with a different class loader graph.

9. The method of claim 8, further comprising:
mapping protocol-specific communications exposed by a plurality of protocol adapters into asynchronous events to be consumed by application components.

10. The method of claim 8, further comprising:
providing a set of functionally specific domains which are communicating through the cluster;
automatically switching the domain a particular machine is hosting; and
wherein the application server provides a domain image (DI) and the initial provisioning for the domain.

11. The method of claim 8, wherein each application server in the cluster includes an instance of the event broker.

12. The method of claim 8, wherein when an event handler registers with the event broker, the event handler stores the event handler and an associated criteria in a criteria table and wherein an event associated with the event handler and a key associated with the criteria table are added to a matching table.

13. The method of claim 12, wherein when an application publishes an event, the event broker receives the event and matches the event to an event handler using the matching table, and wherein the event broker notifies the event handler of the event.

14. The method of claim 12, wherein when an application server fails, the event broker is notified that the application server has left the cluster and the event broker removes entries from the criteria table associated with the application server.

15. A non-transitory computer readable storage medium including instructions stored thereon which, when executed by a computer, cause the computer to perform the steps of:
providing at least one computer, including a computer readable medium and processor;
organizing a plurality of application servers, executing on the at least one computer, in a cluster, wherein the plurality of application servers includes a first application server that includes an event broker distributed across the cluster, said event broker providing a distributed publish-subscribe mechanism that is a generic interface to the plurality of application servers in the cluster;
filtering events, by the event broker, with event attributes by way of matching criteria; and
dispatching events, by the event broker, to specific listeners based on the criteria
providing distributed class loading with an OSGi-type of class loading framework, wherein marshalling and un-marshalling classes are sent from one virtual machine (VM) instance with a specific class loader graph to another VM instance with a different class loader graph.

16. The non-transitory computer readable storage medium of claim 15, including instructions stored thereon which, when executed by a computer, cause the computer to perform steps further comprising:
mapping protocol-specific communications exposed by a plurality of protocol adapters into asynchronous events to be consumed by application components.

17. The non-transitory computer readable storage medium of claim 15, including instructions stored thereon which, when executed by a computer, cause the computer to perform steps further comprising:
providing a set of functionally specific domains which are communicating through the cluster;
automatically switching the domain a particular machine is hosting; and
wherein the application server provides a domain image (DI) and the initial provisioning for the domain.

18. The non-transitory computer readable storage medium of claim 15, wherein when an event handler registers with the event broker, the event handler stores the event handler and an associated criteria in a criteria table and wherein an event associated with the event handler and a key associated with the criteria table are added to a matching table.

19. The non-transitory computer readable storage medium of claim 18, wherein when an application publishes an event, the event broker receives the event and matches the event to an event handler using the matching table, and wherein the event broker notifies the event handler of the event.

20. The non-transitory computer readable storage medium of claim 18, wherein when an application server fails, the event broker is notified that the application server has left the cluster and the event broker removes entries from the criteria table associated with the application server.

* * * * *

UNITED STATES PATENT AND TRADEMARK OFFICE
CERTIFICATE OF CORRECTION

| | | |
|---|---|---|
| PATENT NO. | : 8,788,580 B2 | Page 1 of 1 |
| APPLICATION NO. | : 13/339287 | |
| DATED | : July 22, 2014 | |
| INVENTOR(S) | : Selitser et al. | |

It is certified that error appears in the above-identified patent and that said Letters Patent is hereby corrected as shown below:

In the Specification,

In column 7, line 15, delete "registered" and insert -- registered. --, therefor.

In column 8, line 41, delete "then" and insert -- than --, therefor.

Signed and Sealed this
Tenth Day of March, 2015

Michelle K. Lee
*Deputy Director of the United States Patent and Trademark Office*